US007968757B2

(12) United States Patent
Abhari et al.

(10) Patent No.: US 7,968,757 B2
(45) Date of Patent: Jun. 28, 2011

(54) HYDROCRACKING PROCESS FOR BIOLOGICAL FEEDSTOCKS AND HYDROCARBONS PRODUCED THEREFROM

(75) Inventors: Ramin Abhari, Bixby, OK (US); Lynn Tomlinson, Tulsa, OK (US); Peter Havlik, Tulsa, OK (US); Nathan Jannasch, Broken Arrow, OK (US)

(73) Assignee: Syntroleum Corporation, Tulsa, OK (US)

( * ) Notice: Subject to any disclaimer, the term of this patent is extended or adjusted under 35 U.S.C. 154(b) by 475 days.

(21) Appl. No.: 12/195,747

(22) Filed: Aug. 21, 2008

(65) Prior Publication Data

US 2010/0043279 A1 Feb. 25, 2010

(51) Int. Cl.
*C10L 1/18* (2006.01)
(52) U.S. Cl. .............. 585/240; 44/307; 44/308; 44/605; 208/49
(58) Field of Classification Search ............. 208/49, 208/57; 44/307–308, 605; 585/240
See application file for complete search history.

(56) References Cited

U.S. PATENT DOCUMENTS

| | | | |
|---|---|---|---|
| 2,163,563 A | 6/1939 | Schrauth |
| 4,992,605 A | 2/1991 | Craig et al. |
| 5,705,722 A | 1/1998 | Monnier et al. |
| 5,851,338 A | 12/1998 | Pushaw |
| 6,855,410 B2 | 2/2005 | Buckley |
| 7,232,935 B2 | 6/2007 | Jakkula et al. |
| 2004/0055209 A1 | 3/2004 | Jakkula et al. |
| 2004/0230085 A1 | 11/2004 | Jakkula et al. |
| 2006/0161032 A1 | 7/2006 | Murzin et al. |
| 2006/0186020 A1 | 8/2006 | Gomes |
| 2006/0199984 A1 | 9/2006 | Kuechler et al. |
| 2006/0207166 A1 | 9/2006 | Herskowitz et al. |
| 2006/0264684 A1 | 11/2006 | Petri et al. |
| 2007/0006523 A1 | 1/2007 | Myllyoja et al. |
| 2007/0010682 A1 | 1/2007 | Myllyoja et al. |
| 2007/0170091 A1 | 7/2007 | Monnier et al. |
| 2008/0083651 A1 | 4/2008 | Abhari et al. |
| 2009/0077866 A1* | 3/2009 | Kalnes et al. ............... 44/308 |

FOREIGN PATENT DOCUMENTS

| | | |
|---|---|---|
| EP | 1728844 | 12/2006 |
| SE | 9700149 | 6/1997 |
| WO | WO 00/11117 | 3/2000 |
| WO | WO 2004/104142 | 12/2004 |
| WO | WO 2005/026297 | 3/2005 |
| WO | 2010022254 A2 | 9/2006 |

(Continued)

OTHER PUBLICATIONS

International Preliminary Report on Patentability; PCT/US2009/054493; dated Feb. 22, 2011.

(Continued)

*Primary Examiner* — Walter D Griffin
*Assistant Examiner* — Brian McCaig
(74) *Attorney, Agent, or Firm* — Hall Estill Law Firm

(57) ABSTRACT

A process for hydrocracking biomass, and the hydrocarbons produced therefrom. A feed stream having free fatty acids, fatty acid esters, or combinations thereof is contacted with a first catalyst under hydrogen pressure and heat. The hydrocarbon product stream which is comprised predominantly of n-paraffins is separated into heavy and light fractions. The heavy fraction is contacted with a second catalyst under hydrogen pressure and heat to produce an effluent stream which is combined with the light n-paraffin fraction to form a unique middle distillate product useful as a diesel or jet fuel.

8 Claims, 4 Drawing Sheets

FOREIGN PATENT DOCUMENTS

| WO | WO2006-100584 | 9/2006 |
|---|---|---|
| WO | WO 2007/068795 | 6/2007 |

OTHER PUBLICATIONS

International Search Report and Written Opinion—PCT/US2009/054493, mailed Apr. 14, 2010.

Sharma, S.D.; Sagara, K. "Latent Heat Storage Materials and Systems: A Review", International Journal of Green Energy, 2: 1-56, 2005.

Wong, A. Monnier, J.; Stumborg, M.; Hogan E. Technical and Economic Aspects of Manufacturing Cetane-Enhanced Diesel Fuel from Canola Oil'; Bio-Oils Symposium: Saskatoon, Saskatchewan, Canada; Mar. 2-3, 1994.

* cited by examiner

HYDROCRACKING PROCESS FOR BIOLOGICAL FEEDSTOCKS AND HYDROCARBONS PRODUCED THEREFROM

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention relates to a process which converts biomass to hydrocarbons. Specifically, it relates to a process for producing hydrocarbon fractions such as liquefied petroleum gas (LPG), naphtha, and middle distillate fuels, such as jet, kerosene, and diesel, from fatty acids and glycerides.

2. Brief Description of the Related Art

Biomass is a renewable alternative to fossil raw materials in production of liquid fuels and chemicals. Development of more efficient biomass conversion processes for better quality fuel products is considered a key step toward wider use of renewable fuels.

Several prior art processes for producing fuels or fuel additives from starting materials such as plants and animals are known. U.S. Pat. No. 4,992,605 to Craig and Soveran (1991) discloses hydrodeoxygenation of vegetable oils to $C_{15}$-$C_{24}$ n-paraffins. The inventors point out that the high freeze point of this composition limits its use to that of additive for improving diesel fuel cetane rating. U.S. Pat. No. 5,705,722 to Monnier and co-inventors (1998) shows that the Craig and Soveran invention can be applied to tall oil, animal fats, and restaurant greases.

Swedish Patent 9700149 to Aalto and co-inventors (1997) teaches that the n-paraffins derived from hydrodeoxygenation of vegetable oils may be hydroisomerized to produce a composition suitable for direct use as diesel fuel. However the hydroisomerization of n-paraffins to native boiling range iso-paraffins is equilibrium limited and thus the product of n-paraffin hydroisomerization will always contain unisomerized n-paraffins. Presence of unisomerized $C_{17}$ plus n-paraffins at even low concentrations can have a detrimental effect on the low temperature properties of the fuel. Referring to an example provided by Aalto and co-inventors, the cloud point of a middle distillate fuel with only 13% unisomerized $C_{17}$ plus n-paraffins is −12° C. (typical Winter diesel cloud point specification is −22° C. maximum).

U.S. Pat. No. 7,232,935 to Jakkula and co-inventors (2007) shows that the hydrodeoxygenation and hydroisomerization may be conducted in a counter-current flow configuration to reduce hydrodeoxygenation catalyst exposure to water, CO, $CO_2$, and hydroisomerization catalyst exposure to $H_2S$ and $NH_3$. Although such a counter-current reactor design is expected to extend catalyst life, it does not address the low temperature performance issues associated with presence of unisomerized C17 plus n-paraffins in the diesel product.

To this end, although processes of the existing art utilize biomass to produce paraffinic biofuels, further improvements are desirable to provide new processing methods to make low cloud point middle distillate fuels.

SUMMARY OF THE INVENTION

Figure 1:
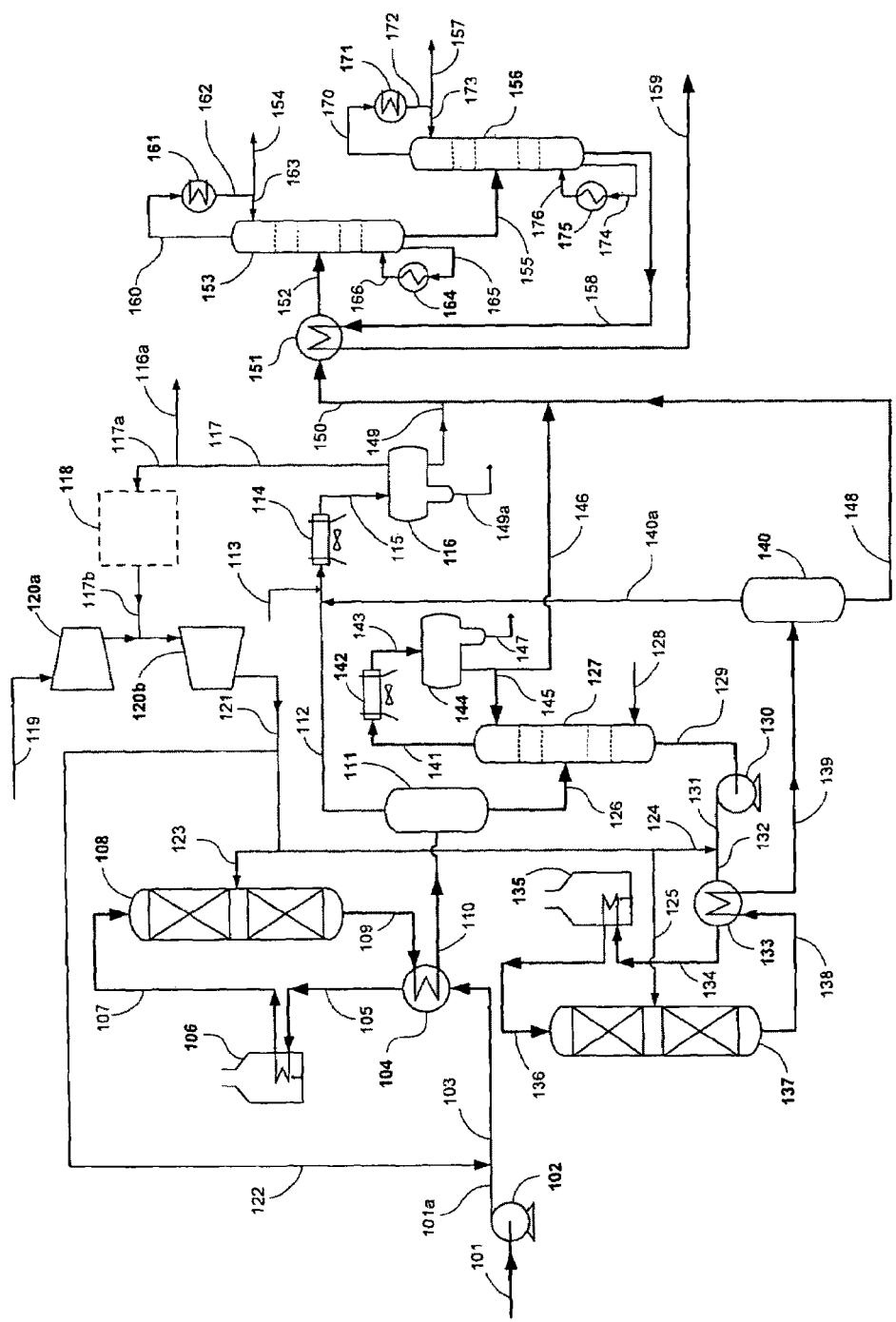
FIG. 1 is a schematic diagram of a hydrocracking process according to the present invention.

Vegetable oils, animal fats, and bio-derived greases are glycerides (mainly tri- and di-glycerides) with varying concentrations of free fatty acids. Tall oil from pine tree is concentrated in fatty acids known as tall oil fatty acids.

The conversion of vegetable oils, animal fats, tall oil fatty acids, tall oil, and/or greases (also known as "biological feedstocks") to paraffinic middle distillate fuels involves two hydroprocessing reaction steps. The first step, shown in Equations 1-4, involves deoxygenation of the triglycerides and free fatty acids over a bimetallic hydrotreating catalyst such as sulfided nickel-molybdenum (NiMo). The oxygen may be removed via reaction with hydrogen (Equations 1, 3b, and 4) or by cracking of $CO/CO_2$ groups (Equations 2 and 3a). The reactions of the first step are accompanied by hydrogenation of the unsaturated triglyceride, free-fatty acid, and hydrocarbon chains. The second step, shown in the illustrative example of Equation 5, involves the hydrocracking of the long chain n-paraffin to shorter chain n-paraffin and isoparaffin molecules. Hydrocracking is commonly conducted using a catalyst with both acid-active cracking and metal-active hydrogenation-dehydrogenation functionalities. Examples of such bi-functional catalysts are platinum (or other metals from Group VIIIB of the periodic table) on amorphous silica-alumina (or other acidic supports such as zeolites). Unlike isomerization (Equation 6), hydrocracking of n-paraffins is not equilibrium limited. Furthermore, hydrocracking reduces the distillation end point of the n-paraffin feedstock while this is virtually unchanged with isomerization. It is clear from this summary that to achieve the desired reduction in both product cloud point/freeze point and distillation end point, hydrocracking is preferred to the isomerization process of prior art.

Equations:

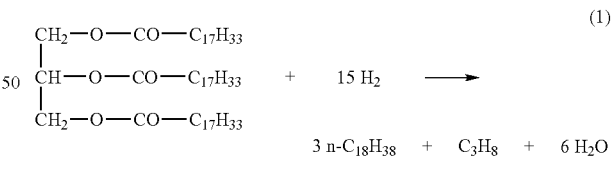

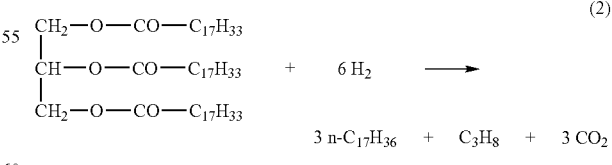

-continued

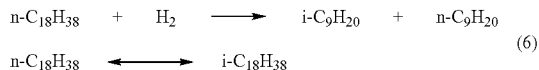

Note: Oleic acid is shown as typical fatty acid for all illustrative reactions. It should be understood by one of ordinary skill in the art that the fatty acid composition may vary in feed stocks of different origin.

Dilution of n-paraffins with lower molecular weight isoparaffins is known to lower the freeze point of the n-paraffin. For instance, if n-hexadecane is mixed with isoparaffins from hydrocracking of n-octadecane, its freeze point will be significantly depressed. This relationship is given by Equation 7.

$$x_n \ln(\gamma_n) = (\Delta H_{fus} T_m / R)[(T_m - T_f)/T_m T_f] - (\Delta C_p / R)[1 - (T_m / T_f) + \ln(T_m / T_f)] \quad (7)$$

In Equation 7, $T_f$ is the mixture freezing point, $T_m$ the pure n-paraffin melt point, $\gamma_n$ is the activity coefficient of the n-paraffin, $x_n$ is the mole fraction of the n-paraffin, $\Delta H_{fus}$ is the heat of fusion of the n-paraffin, $\Delta C_p$ is the difference in the heat capacities between the liquid and solid n-paraffin, and R is the ideal gas constant.

DETAILED DESCRIPTION OF THE INVENTION

Referring now to the drawings, and more particularly to FIG. 1, shown therein is a schematic of one embodiment of the operation of the process in accordance with the present invention as described herein. A biofeed 101, containing fatty acids and/or fatty acid esters, is pressurized to between about 500 psig to about 2,500 psig using pump 102. A pressurized biofeed 101a is combined with a recycled hydrogen stream 122 (compressed to the same pressure) and provided at a ratio of about 3,000 to about 15,000 standard cubic feet of hydrogen per barrel of fresh biofeed (i.e., gas-to-oil ratio of about 3,000 to about 15,000 SCF/bbl). Subsequently the combined reactor feed 103 is heated through a feed-effluent heat exchanger 104 to produce stream 105 before further heating to the desired reactor inlet temperature of between about 400° F. and about 750° F. in heater 106. A preheated feed stream 107 enters a hydrotreater 108. The hydrotreater 108 is packed with a first catalyst which is a NiMo/alumina catalyst. Typical liquid hourly space velocities (LHSV) would be in the range of about 0.25 hr$^{-1}$ to about 2.0 hr$^{-1}$ for fresh biofeed. When the reactor is operated between about 400° F. and about 750° F. in the presence of hydrogen, the biofeed undergoes the aforementioned reactions and converts into primarily $C_{15}$ to $C_{18}$ n-paraffins. It should be understood by one of ordinary skill in the art that any known bimetallic hydrotreating catalysts, such as CoMo and NiW, on other supports, such as silica alumina or phosphated alumina, may also be used as catalyst for hydrotreater 108. The first catalyst can also be layered in beds of increasing activity (that is, different catalyst formulations that have more or less conversion potential) in the direction of the reactant flow. The beds may also be layered according to size (a practice known as grading) to mitigate pressure drop from catalyst fouling due to deposits. It should be understood by one of ordinary skill in the art that the catalyst may be positioned in the reactor by any variety of ways so long as the catalyst functions in accordance with the present invention.

The hydrotreater reactions are exothermic and provisions should be made to prevent excessive temperature rise (for example, greater than about 750° F.). In the embodiment described herein, the equivalent isothermal temperature (also known as the weighted average temperature) of hydrotreater 108 is reduced by the injection of quench hydrogen 123.

The effluent 109 of the hydrotreater 108 is cooled through a feed-effluent heat exchanger 104. A cooled stream 110 contains liquid and vapor hydrocarbons, as well as hydrogen and water vapor. This two-phase stream is separated into a liquid hydrocarbon stream 126 and a vapor stream 112 in drum 111 under approximate reactor discharge pressures at about 350 to about 450° F. temperature. The liquid hydrocarbon stream 126 which includes a great portion of the n-paraffin products of the biofeed hydrotreating reactions is transferred to distillation column 127.

The predominantly $C_{16}$ minus n-paraffin light fraction is produced by column 127 as overhead product stream number 146. The overhead product stream 146 is produced by the counter-contacting of stream 126 with stream 128 which can be comprised of water vapor, hydrocarbon vapors, nitrogen, or hydrogen within column 127. Column 127 produces a vaporized overhead product stream 141 and is condensed by cooler 142 to make stream 143. In the case of using water vapor for stream 128, condensed water vapor in stream 143 is phase separated in drum 144 to produce process water stream 147. Part of the condensed hydrocarbon is refluxed back to column 127 as stream 145 while the balance of the hydrocarbon is the aforementioned light fraction stream 146.

Distillation column 127 operating conditions are selected to recover at least 1% of the $C_{16}$ produced by the hydrotreater in the light fraction, and preferably at least 50%, and more preferably at least 90%. In the embodiment described herein, the column pressure is about 40 psig to about 60 psig with about 680° F. to about 300° F. bottom-top temperature profile, although lower pressure operation (including sub-atmospheric) may also be used to minimize column bottom temperatures and to minimize thermal cracking of the bottoms stream. In other embodiments, a reboiler many be used to produce hydrocarbon vapors for column 127.

The predominantly $C_{17}$ plus n-paraffin heavy fraction stream 129 which is recovered by column 127 is pressured through pump 130 to about 1,000 psig. This pressure corresponds to the desired hydrocracker 137 operating pressure and may be about 300 psig to about 2,500 psig. The pressurized predominantly $C_{17}$ plus n-paraffin heavy fraction stream 131 is combined with compressed hydrogen 124 and heated through feed-effluent exchanger 133. The hydrogen stream is provided in a gas-to-oil ratio of about 500 to about 5,000 SCF/bbl. The temperature of the heated stream 134 is further increased in heater 135 to the desired hydrocracker feed temperature of about 600° F. Depending on the type of catalyst and extent of cracking desired, the operating temperature of hydrocracker 137 may be in the about 500° F. to about 750° F. range. A hydrogen quench stream 125 may be used to reduce the equivalent isothermal temperature in the hydrocracker 137. Hydrocracker 137 is loaded with a second catalyst which is a typical hydrocracking catalysts such as platinum on amorphous silica alumina. Examples of other hydrocracking catalysts are those with base metals on the same support, such as NiW on silica alumina, and the same or other noble metals on crystalline supports, such as platinum on zeolites. However, it should be understood by one of ordinary skill in the art that any known hydrocracking catalyst may be utilized so long as it functions in accordance with the present invention.

Hydrocracker 137 operating conditions are selected to hydrocrack at least 10% of the predominantly $C_{17}$ plus n-paraffin heavy fraction per reactor pass, and preferably at least 50%, and more preferably at least 80% to maximize the yield of hydrocracked distillate.

Effluent 138 from hydrocracker 137 is partially cooled in an exchanger 133. The effluent 139 from the exchanger 133 undergoes vapors separation in drum 140. The hydrogen-rich vapor stream 140a is combined with stream 112 before entering air-cooler 114. Water stream 113 is injected upstream of cooler 114 to wash any salt deposits that may form upon cooling. The cooled hydrogen-rich vapor stream 115 is fed to drum 116 for further light end hydrocarbon recovery.

The pressure at drum 116 depends on pressure drop between reactor discharge and the drum, while the temperature, controlled by air-cooler 114 is from about 50° F. to about 150° F. depending on ambient conditions. The liquids in drum 116 are phase separated into water 149a and light hydrocarbons 149. The gas phase from separator 116 comprises the hydrogen-rich gas 117. Hydrogen sulfide, ammonia, and carbon dioxide may optionally be removed from the recycle hydrogen-rich treat gas 117b in scrubber 118. A fraction of the recycle hydrogen-rich gas, stream 116a, may be purged to fuel to prevent buildup of components that are not efficiently removed in scrubber 118 such as light hydrocarbons. In some embodiments, membrane systems or adsorption beds may be used in lieu of or in addition to the scrubber 118 to achieve the desired recycle treat gas composition. Typically the treat gas composition is controlled from about 75 and about 99 mol % hydrogen. Purified treat gas 117b is combined with makeup hydrogen 119 before recompression to reactor pressure in recycle compressor 120b. If the makeup hydrogen pressure is below the required suction pressure for compressor 120b, a booster compressor 120a may be provided.

A non-hydrocracked $C_{16}$ minus n-paraffin stream 146 is combined with a hydrocracked stream 148 and a condensed light hydrocarbons stream 149 to form product stream 150. Product stream 150 may be preheated through feed-effluent exchanger 151 before entering a debutanizer column 153 as heated stream 152. The debutanizer overhead product, stream 154, comprises of propane, butane, and iso-butane, and may be referred to as "renewable LPG" (liquefied petroleum gas). In this embodiment, reboiler 164 heats stream 165 to vapors 166. Vaporized renewable LPG stream 160 is condensed by cooler 161. Stream 162 exits cooler 161 to provide renewable LPG stream 154 while some of stream 162 is refluxed back to column 153 as reflux stream 163. A debutanized product (free of renewable LPG) stream 155 is then separated into naphtha stream 157 and middle distillate stream 158 in middle distillate column 156. In this embodiment, reboiler 175 heats stream 174 to vapors 176. The naphtha vapors 170 are removed overhead and the desired middle distillate product flash point, typically from about 100 to about 150° F., is obtained. A diesel product 158 may be cooled in exchanger 151. Vaporized naphtha stream 170 is condensed by cooler 171. Stream 172 exits cooler 171 to form naphtha stream 157 while some of stream 172 is refluxed back to column 156 as reflux stream 173. The naphtha from column 156 (stream 157) is a paraffinic naphtha composition suitable for use as fuel or steam cracker feedstock for production of olefins. The cooled middle distillate product 159 is suitable for direct use in diesel or turbine engines.

The water byproduct of the process, collected in streams 147 and 149a, is sent to offsite treatment.

Figure 2:
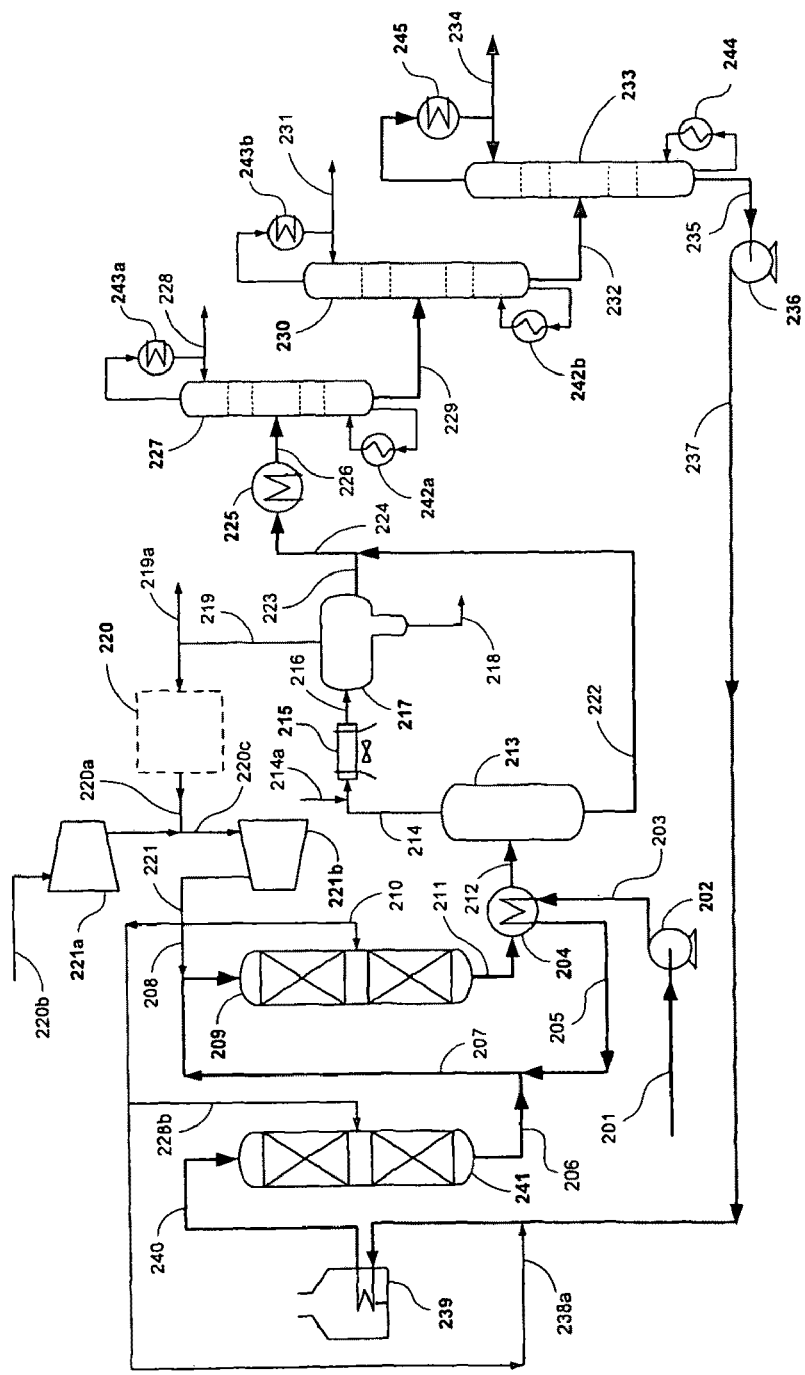
FIG. 2 is a schematic diagram showing an alternative embodiment of the hydrocracking process according to the present invention.

An alternate embodiment of the inventive process disclosed herein is provided in FIG. 2. Unless otherwise indicated, the operating conditions of the reactors and separators are the same as those described in the embodiment of FIG. 1. Referring to FIG. 2, a biofeed 201 is pressured via pump 202. In this embodiment, a hydrotreater 209 and a hydrocracker 241 are operated at roughly the same pressure, typically about 1,000 psig. Pressurized feedstock stream 203 is preheated through feed-effluent exchanger 204. Heated stream 205 is diluted with a high temperature hydrocracker effluent 206, which is further discussed later in this embodiment. The diluted biofeed stream 207 is further combined with compressed hydrogen stream 208 before entering hydrotreater 209. Diluting the feed 207 with hydrocracker effluent 206 reduces the adiabatic temperature rise associated with the exothermic hydrotreater 209 reactions. Further cooling and a lower equivalent isothermal temperature may be achieved by injection of quench hydrogen 210 between hydrotreater 209 catalyst beds.

As previously discussed, hydrotreater 209 is loaded with a first catalyst and operated as such to make predominantly $C_{15}$ to $C_{18}$ n-paraffins per the previous embodiment discussed in FIG. 1.

The hydrotreater effluent 211 is cooled in exchanger 204 to form cooled effluent stream 212 before hydrogen-rich vapors stream 214 is separated in separator drum 213. Drum 213 operates at hydrotreater discharge pressure, minus pressure drop, and from about 350° F. to about 450° F. Water 214a is blended with hydrogen-rich vapors stream 214 prior to entering air cooler 215 to wash any salts formed during condensation. The air cooler exit stream 216 is a three phase system consisting of recycle hydrogen, light hydrocarbons and water. The recycle hydrogen stream 219, light hydrocarbon stream 223, and process water stream 218 are separated in drum 217. Recycle hydrogen 219 may be scrubbed in unit 220 to remove hydrogen sulfide, ammonia, and carbon dioxide. As described in the embodiment of FIG. 1, some of the recycle hydrogen may be purged as stream 219a to prevent buildup of the reaction products that are not removed by scrubbing.

The purified recycle hydrogen stream 220a may be combined with makeup hydrogen 220b to provide the treat gas 220c to the reactors via compressor 221b. Makeup hydrogen may be compressed with a booster compressor 221a to recycle compressor 221b, thus providing the treat gas 221 for the hydrotreater and hydrocracker reactors. Booster compressor 221a raises the pressure of the makeup hydrogen 220b to suction pressure requirements of the recycle compressor 221b.

The hydrocarbon products of drums 213 and 217, streams 222 and 223 respectively, are combined to form stream 224 which is distilled into renewable LPG 228, naphtha 231, middle distillate 234, and a predominantly $C_{17}$ plus n-paraffin heavy fraction 235. In the embodiment of FIG. 2, the product separation is a fractionation train that uses a debutanizer column 227, a naphtha column 230, and a middle distillate column 233. As described in the embodiment of FIG. 1 for the debutanizer column 153 and middle distillate column 156, both columns use reboilers (242a and 242b) to provide heat to vaporize and separate the overhead product from the bottoms product for each respective column. Coolers (243a and 243b) used to condense the overhead vapor to provide reflux 234a and produce the overhead products for the respective columns.

With respect to this embodiment, middle distillate column 233 is the primary focus since it separates the predominantly $C_{16}$ minus n-paraffin light fraction from the predominantly $C_{17}$ plus n-paraffin heavy fraction. Middle distillate column 233 is operated to recover at least 1% of the $C_{16}$ produced by the hydrotreater, and preferably at least 50%, and more preferably at least 90%. In the embodiment described herein, the column pressure is about 40 psig to about 60 psig with about 680° F. to about 300° F. bottom-top temperature profile, although lower pressure operation (including sub-atmospheric) may also be used to minimize column bottom temperatures and to minimize thermal cracking of the bottoms stream. The heat of vaporization is provided by reboiler 244. Cooler 245 condenses the $C_{16}$ minus vapors and provides reflux 234a. Steam injection, or counter-current contacting with other pressurized gases, may be used instead of reboiler to separate the light fraction from the heavy fraction at pressures ranging from 290 psig to 2,175 psig can be also used.

The predominantly $C_{17}$ plus n-paraffin heavy fraction is separated as stream 235 and recycled to the hydrocracker 241 in this embodiment. The recycle pump 236 pressurizes stream 235 to the aforementioned reactor system pressure, about 1000 psig. Pressurized stream 237 is combined with recycle hydrogen 238a before further increase in temperature in heater 239. A preheated stream 240 enters hydrocracker 241 at the aforementioned temperatures per previous embodiment (FIG. 1). Hydrocracker 241 is loaded in accordance with aforementioned second catalyst per previous embodiment (FIG. 1). Quench hydrogen 228b is provided to reduce the hydrocracker equivalent isothermal temperature. The predominantly $C_{17}$ plus n-paraffin heavy fraction is thus cracked into lighter paraffins in hydrocracker 241. The hydrocracker effluent 206 contains the products of $C_{17}$ plus n-paraffin cracking which then dilutes stream 205 as described herein.

Hydrocracker 241 operating conditions are selected to hydrocrack at least 10% of the predominantly $C_{17}$ plus n-paraffin heavy fraction per reactor pass, and preferably at least 50%, and more preferably at least 80%, to maximize the yield of hydrocracked distillate per reactor pass. In this embodiment, the hydrocracker 241 operates using recycle-to-extinction operation whereby all of the $C_{17}$ and heavier hydrocarbons are fully hydrocracked regardless of the per pass hydrocracker conversion. The middle distillate 234 thus contains predominantly $C_{16}$ minus n-paraffin light fraction from the hydrotreater 209 which did not undergo hydrocracking in the hydrocracker 241, and $C_{16}$ minus cracked paraffins from the hydrocracking of the predominantly $C_{17}$ plus n-paraffin heavy fraction. As such the fuel contains virtually no $C_{17}$ plus n-paraffins which are deleterious to low temperature flow properties. Furthermore, since the predominantly $C_{16}$ minus n-paraffin light fraction in the inventive process does not undergo hydrocracking, the overall middle distillate yield is higher than if all the n-paraffins were hydrocracked.

Figure 3:
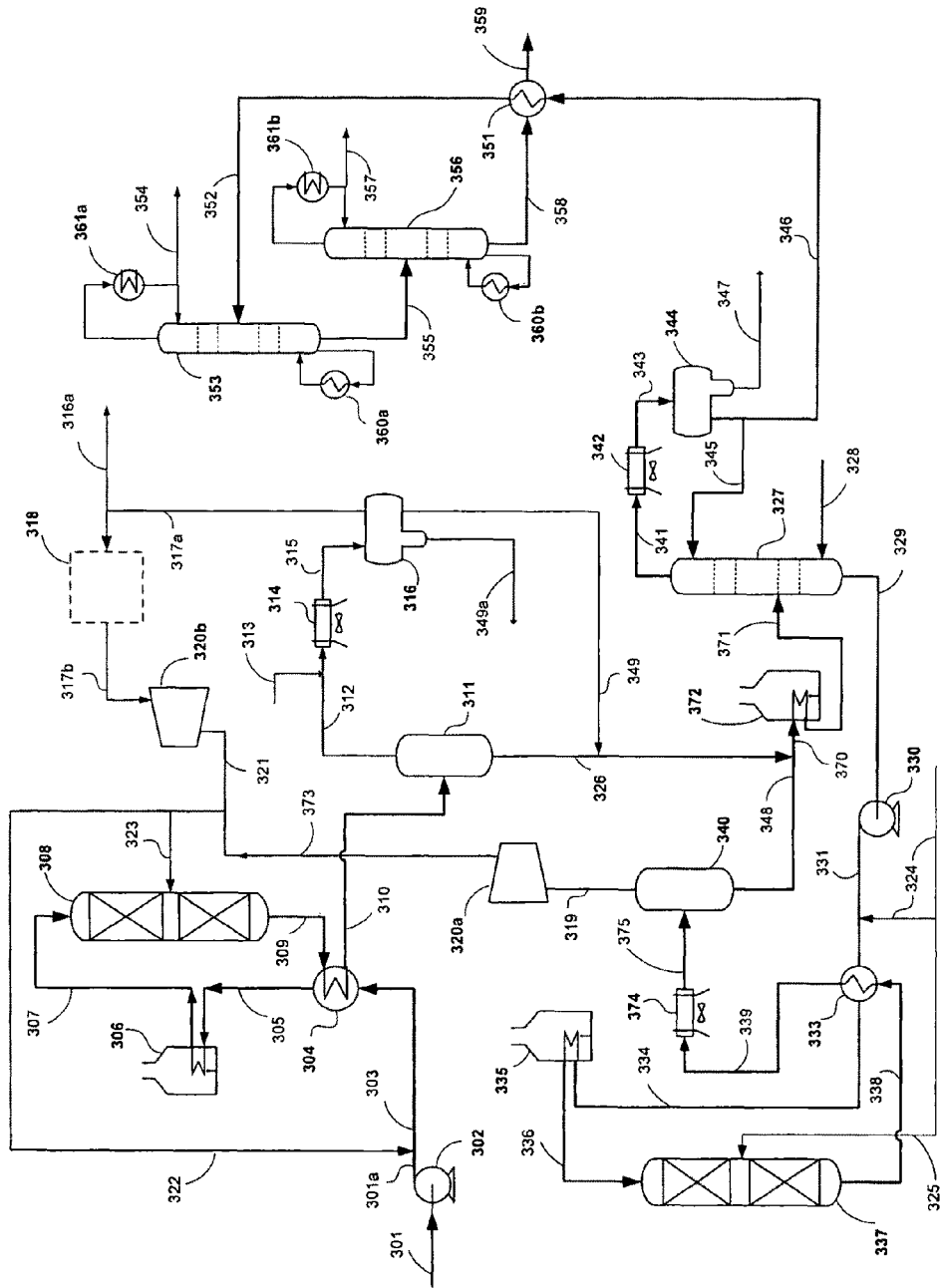
FIG. 3 is a schematic diagram showing a second alternative embodiment of the hydrocracking process according to the present invention.

Referring to the drawings, and particularly to FIG. 3, shown therein is a schematic of another embodiment of the operation of the process in accordance with the present invention as described herein. A biofeed 301, containing fatty acids and/or fatty acid esters, is pressurized to between about 500 psig to about 2,500 psig using pump 302. A pressurized biofeed 301a is combined with a recycled hydrogen stream 322 (compressed to the same pressure) and provided at a ratio of about 3,000 to about 15,000 standard cubic feet of hydrogen per barrel of fresh biofeed (i.e. gas-to-oil ratio of about 3,000 to about 15,000 SCF/bbl). Subsequently the combined reactor feed 303 is heated through a feed-effluent heat exchanger 304 to produce stream 305 before further heating to the desired reactor inlet temperature of between about 400° F. and about 750° F. in heater 306. A preheated feed stream 307 enters a hydrotreater 308.

Hydrotreater 308 is loaded with aforementioned first catalyst and operated to make predominantly $C_{15}$ to $C_{18}$ n-paraffins per the previous embodiments (FIG. 1 and FIG. 2).

The hydrotreater reactions are exothermic and provisions are made to prevent excessive temperature rise (to greater than 750° F.). In the embodiment described herein, the equivalent isothermal temperature (also known as the weighted average temperature) of hydrotreater 308 is reduced by the injection of quench hydrogen 323.

The effluent 309 of the hydrotreater 308 is cooled through a feed-effluent heat exchanger 304. A cooled stream 310 contains liquid and vapor hydrocarbons, as well as hydrogen and water vapor. This two-phase stream is separated into a liquid hydrocarbon stream 326 and a vapor stream 312 in drum 311 under reactor discharge pressures at 350-450° F. temperature. Hydrogen-rich vapor stream 312 recovered from drum 311 is mixed with water stream 313 prior to cooler 314 to wash any salt deposits that may form upon condensation. Cooler 314 cools stream 315 to from about 50° F. to about 150° F. depending on ambient conditions. The cooled hydrogen-rich vapor stream 315 is routed to high pressure cold separator 316 where additional hydrocarbon stream 349 is recovered and phase separated from water stream 349a. The gas phase 317a from separator 316 comprises the hydrogen-rich recycle treat gas. Hydrogen sulfide, ammonia, and carbon dioxide may optionally be removed from the recycle hydrogen in scrubber 318. A fraction of the recycle hydrogen, stream 316a, may be purged to fuel to prevent buildup of components that are not efficiently removed in scrubber 318. In some embodiments, membrane systems or adsorption beds may be used in lieu of or in addition to the scrubber 318 to achieve the desired recycle treat gas composition. Typically the treat gas composition is controlled from about 75 and about 99 mol % hydrogen. Purified treat gas 317b is compressed back to reactor pressure with recycle compressor 320b to form stream 321. Make-up hydrogen stream 373 is mixed with stream 321 to complete the recycle loop for the hydrogen gas. Make-up hydrogen stream 373 is provided via the hydrogen-rich gas from the hydrocracker 337 reactor system which is discussed later in this embodiment.

The liquid hydrocarbon stream 326 and hydrocarbon stream 349, which comprises the n-paraffin products from the biofeed hydrotreating reactions, are mixed to create part of stream 370. Stream 370 is heated by preheater 372 to produce stream 371 and then transferred to distillation column 327. Distillation column 327 operating conditions are selected such that the hydrotreater products are separated into a predominantly $C_{16}$ minus n-paraffin light fraction in the column overheads and a predominantly $C_{17}$ plus n-paraffin heavy fraction in the column bottoms. Distillation column 327 operating conditions are selected to recover at least 1% of the $C_{16}$ produced by the hydrotreater, and preferably at least 50%, and more preferably at least 90%. In the embodiment described herein, the column pressure is about 40 psig to about 60 psig with about 680° F. to about 300° F. bottom-top temperature profile, although lower pressure operation (including sub-atmospheric) may also be used to minimize column bottom temperatures and to minimize thermal cracking of the bottoms stream. In addition to vaporizing part of the feed with feed preheater 372, additional vaporization for column 327 is provided by the injection of super-heated water vapor stream 328. In other embodiments, a reboiler may be used for this purpose instead of direct injection of steam. Additionally, the counter-contacting of the hydrocarbon liquid with water vapor, hydrogen, or nitrogen to separate the light fraction from the heavy fraction at pressures ranging from 290 psig to 2,175 psig can be also used. In the embodiment described herein, the overhead vapor stream 341 is condensed by air cooler 342. The condensed overhead vapor stream 343 is accumulated by overhead drum 344 to separate process water 347 from the condensed product. Some of the overhead product is refluxed to the column as stream 345 and the balance is routed through conduit 346 for further fractionation into final middle distillate, naphtha, and liquefied petroleum gas (LPG) products.

Stream 329, which is comprised of the predominantly $C_{17}$ plus n-paraffin heavy fraction, is pressured through pump 330 to about 1,000 psig. This pressure corresponds to a desired hydrocracker 337 operating pressure and can range from about 300 psig to about 2,000 psig. Stream 331 is combined with compressed hydrogen stream 324 of the same pressure and heated through feed-effluent exchanger 333. Compressed hydrogen stream 324 is provided from an external source. The compressed hydrogen stream 324 is provided at a gas-to-oil ratio of about 500 SCF/bbl to about 5,000 SCF/bbl. Heated stream 334 from exchanger 333 is further increased in temperature by heater 335 to produce stream 336 to meet the desired hydrocracker feed temperature of about 600° F. Depending on the type of catalyst and extent of cracking desired, the temperature can range from about 500° F. to about 750° F. range. Hydrocracker 337 is loaded in accordance with aforementioned second catalyst per previous embodiment (FIG. 1 and FIG. 2). Hydrocracker 337 operating conditions are selected to hydrocrack at least 5% of the predominantly $C_{17}$ plus n-paraffin heavy fraction per reactor pass, and preferably at least 50%, and more preferably at least 80% to maximize the yield of hydrocracked distillate per reactor pass. A hydrogen quench stream 325 may be used to control the equivalent isothermal temperature in the hydrocracker 337.

Effluent 338 from hydrocracker 337 is partially cooled in exchanger 333. The effluent 339 from the exchanger 333 undergoes final cooling by air cooler 374 to produce stream 375. Drum 340 separates the hydrocracker product hydrocarbon stream 348 from the hydrogen-rich vapor stream 319. The hydrogen-rich vapor stream 319 is compressed by compressor 320a and is routed to the hydrotreater reactor system as make-up hydrogen stream 373. Hydrocracker product hydrocarbon stream 348, which includes cracked products of the biofeed hydrocracking reactions, are mixed with hydrotreater product stream 326 and 349 to form the balance of aforementioned stream 370 and transferred to distillation column 327.

The hydrocracker product hydrocarbon containing the cracked hydrocarbons is distilled with the aforementioned hydrotreater product by distillation column 327. With distillation column 327 operating at the aforementioned operating conditions, all uncracked hydrocarbons derived from hydrocracker 337 are concentrated into the bottoms and mixed in-situ with predominantly $C_{17}$ plus n-paraffin heavy fraction from hydrotreater 308. In this embodiment, the hydrocracker 337 operates using recycle-to-extinction operation whereby all of the $C_{17}$ and heavier hydrocarbons are fully hydrocracked regardless of the per pass hydrocracker conversion. The overhead product stream 346 and eventual middle distillate product stream 359 thus contains predominantly $C_{16}$ minus n-paraffin light fraction from the hydrotreater 308, which do not undergo hydrocracking in the hydrocracker 337, and $C_{16}$ minus cracked paraffins from the hydrocracking of the predominantly $C_{17}$ plus n-paraffin heavy fraction. As such the fuel contains virtually no $C_{17}$ plus n-paraffins which are deleterious to low temperature flow properties. Furthermore, since the predominantly $C_{16}$ minus n-paraffin light fraction in the inventive process does not undergo hydrocracking, the overall middle distillate yield is higher than if all the n-paraffins were hydrocracked.

Distillation column 327 overhead product stream 346 is preheated through feed-effluent exchanger 351 before entering debutanizer column 353. As described in the embodiment of FIG. 1 for the debutanizer column 153 and distillate column 156, the columns use reboilers 361a and 361b to supply the heat to vaporize and separate the overhead product from the bottoms product for each respective column. Coolers 361a and 361b are used to condense the overhead vapors and produce the overhead products for the respective columns. The debutanizer overhead product, stream 354, comprising of propane, butane, and iso-butane, and may be referred to as aforementioned "renewable LPG". A debutanized product (free of renewable LPG) stream 355 is then separated into naphtha stream 357 and middle distillate stream 358 in middle distillate column 356. Middle distillate stream 358 is cooled in exchanger 351 to form cooled middle distillate stream 359. The cooled middle distillate product 35.9 is suitable for direct use in diesel or turbine engines.

The water byproduct of the process, collected in streams 347 and 349a, is sent to offsite treatment.

The product of the present invention provides an alternative processing method for producing a renewable middle distillate by blending a hydrocracked middle distillate with a predominantly $C_{16}$ minus n-paraffin light fraction from a hydrotreated biorenewable feedstock. The resultant middle distillate product has improved cold temperature properties by mixing the predominantly $C_{16}$ minus n-paraffin light fraction with a hydrocracked middle distillate derived from the hydrocracking of a predominantly $C_{17}$ plus n-paraffin heavy fraction.

In order to further illustrate the present invention, the following examples are provided. However, it is to be understood that the examples are for illustrative purposes and are not to be construed as limiting the scope of the subject invention.

EXAMPLES

Example 1

Hydrotreating of a Biorenewable Feedstock

The present example demonstrates the conversion of a biorenewable feedstock into a hydrocarbon suitable for hydrocracking. A 100 cc isothermal tubular reactor was filled with 80 cc of a commercially available NiMo catalyst (acquired from Catalyst Trading Corporation, Houston, Tex.) and 70-100 mesh glass beads. The catalyst was sulfided in the presence of hydrogen with dimethyl disulfide at two hold temperatures: 6 hours at 400° F. and 12 hrs at 650° F. Hydrogen sulfide break-through was confirmed before the temperature was raised from 400° F. to 650° F. at 50° F./hr. After sulfiding, the reactor was cooled to 400° F.

Next a triglyceride/fatty acid feed was introduced to the isothermal reactor. The reactor was slowly heated to 650° F. to achieve full conversion of the triglyceride/fatty acid feed to predominantly n-paraffins. The reactor temperature was further increased to 700° F. to maintain good catalyst activity at 80 cc/hr feed rate (1.0 $hr^{-1}$ LHSV).

The hydrotreater performance with soybean oil as the triglyceride/fatty acid feed is summarized in Table 1.

TABLE 1

| Hydrotreater Operating Conditions and Product Composition | |
|---|---|
| Catalyst | |
| Active Metals | Sulfided NiMo |
| Support | Alumina |
| Reactor Conditions | |
| Feed | Soybean Oil |
| Temperature (° F.) | 700 |

TABLE 1-continued

Hydrotreater Operating Conditions and Product Composition

| | |
|---|---|
| Pressure (psig) | 1,600 |
| Hydrogen Gas/Oil Ratio (scf/bbl) | 10,000 |
| LHSV (hr$^{-1}$) | 1.0 |
| Liquid Hydrocarbon Carbon Distribution (Mass %) | |
| $C_{12}$ minus | 1.6 |
| $C_{13}$ | 0.3 |
| $C_{14}$ | 0.3 |
| $C_{15}$ | 3.4 |
| $C_{16}$ | 8.1 |
| $C_{17}$ | 23.4 |
| $C_{18}$ | 56.0 |
| $C_{19}$ plus | 6.9 |
| Liquid Hydrocarbon Properties | |
| Specific Gravity at 60° F. | 0.792 |
| n-Paraffin Content (Mass %) | 91.7 |

The gas chromatogram of the liquid hydrocarbon product confirmed that under the hydrotreater conditions of Table 1 the soybean oil was converted to predominantly C15-C18 n-paraffins with no detectable oxygenates remaining as shown in Table 1. Limited cracked products ($C_{12}$—) were detected in the total liquid hydrocarbon product.

Example 2

Hydrocracking of Predominantly C17 Plus n-paraffin Feedstock

A predominantly $C_{17}$ plus n-paraffin feedstock was used as feed for a hydrocracking pilot plant as shown in Table 2. The predominantly $C_{17}$ plus n-paraffins were derived in accordance with Example 1.

TABLE 2

Hydrocracker Feedstock Characteristics

| | |
|---|---|
| Hydrocracker Feed Carbon Distribution (Mass %) | |
| $C_{12}$ minus | 1.2 |
| $C_{13}$ | 0.2 |
| $C_{14}$ | 0.2 |
| $C_{15}$ | 1.9 |
| $C_{16}$ | 3.8 |
| $C_{17}$ | 29.9 |
| $C_{18}$ | 57.3 |
| $C_{19}$ plus | 5.5 |
| Hydrocracker Feed Properties | |
| Specific Gravity at 60° F. | 0.794 |

The hydrocracker pilot plant system comprised of a single reactor followed by high and low pressure separators to collect the hydrocracker hydrocarbon product. The hydrocracker reactor was loaded with 100 cc of hydrocracking catalyst. The catalyst was a platinum-palladium on amorphous alumina/silica support. The reactor was pressurized to 1,000 psig and reduced at 700° F. under hydrogen flowing conditions for approximately 4 hours. The catalyst was cooled to 400° F. in preparation for introducing feed to the reactor.

The predominantly $C_{17}$ plus n-paraffin feedstock was fed to the hydrocracker pilot plant system and the temperature of the reactor containing hydrocracking catalyst was increased to 685° F. at 1.0 hr$^{-1}$ LHSV and a hydrogen-to-oil ratio of 2,000 SCFB as shown in Table 3. The wide boiling range hydrocarbon product from hydrocracker pilot plant system was accumulated to produce a middle distillate product. The wide-boiling range hydrocarbon product was distilled in a round bottom flask using a heating mantle and a Vigreux column to remove the $C_8$ minus hydrocarbons. A middle distillate product was produced from the stripping operation and analyzed as shown in Table 3.

TABLE 3

Hydrocracker Conditions and Product Composition

| | |
|---|---|
| Catalyst | |
| Active Metals | Platinum/Paladium |
| Support | Amorphous Silica/Alumina |
| Reactor Conditions | |
| Feed | Hydrotreated Soybean Oil |
| Temperature (° F.) | 685 |
| Pressure (psig) | 1,000 |
| Hydrogen Gas/Oil Ratio (scf/bbl) | 2,000 |
| LHSV (hr$^{-1}$) | 1.0 |
| Middle Distillate Carbon Distribution (Mass %) | |
| $C_7$ minus | 0.1 |
| $C_8$ | 1.7 |
| $C_9$ | 8.9 |
| $C_{10}$ | 14.3 |
| $C_{11}$ | 16.6 |
| $C_{12}$ | 16.6 |
| $C_{13}$ | 13.8 |
| $C_{14}$ | 12.9 |
| $C_{15}$ | 7.3 |
| $C_{16}$ | 5.4 |
| $C_{17}$ | 2.1 |
| $C_{18}$ | 0.3 |
| Middle Distillate Properties | |
| Cloud Point (° C.) | −43 |
| Specific Gravity at 60° F. | 0.776 |

As illustrated in Table 3 by the carbon distribution and specific gravity, the middle distillate is comprised of lower molecular weight products produced from the hydrocracking of the predominantly $C_{17}$ plus n-paraffin feedstock. Due to the significant reduction in molecular weight of the feedstock, the resulting middle distillate has an extremely low cloud point as shown in Table 3.

Example 3

Blending of Hydrocracked Middle Distillate and n-hexadecane

A hydrocracked middle distillate produced according to Examples 1 and 2 was blended with n-hexadecane at various ratios. The hydrocracked middle distillate used for the blending has an extremely low cloud point at −55° C. produced in accordance with examples 1 and 2. The n-hexadecane component is representative of the predominantly $C_{16}$ minus n-paraffin light fraction produced by present invention. The n-hexadecane, and thus the predominantly $C_{16}$ minus n-paraffin light fraction, has a melt point of 18.2° C. which by itself is not suitable for use as a final middle distillate fuel. But when the n-hexadecane component is blended with the hydrocracked middle distillate component, a middle distillate is created having cold temperature properties which are suitable for use as a final middle distillate fuel.

TABLE 4

| Cold Temperature Properties of Hydrocracked Middle Distillate and n-Hexadecane Blend | | |
|---|---|---|
| Hydrocracked Middle Distillate (Mass %) | n-Hexadecane (Mass %) | Cloud Point (° C.) of Blend |
| 100.0 | 0.0 | −55 |
| 98.9 | 1.1 | −47 |
| 97.4 | 2.6 | −37 |
| 94.9 | 5.1 | −27 |
| 92.2 | 7.8 | −21 |
| 90.0 | 10.0 | −17 |
| 80.0 | 20.0 | −7 |
| 70.0 | 30.0 | 0 |

As shown in Table 4, the cloud point of the blend increases as additional n-hexadecane is added to the blend. As it relates to the current invention therefore, the quantity of $C_{16}$ fatty acids and the recovery of $C_{16}$ n-paraffins by the separation step of present invention controls the cloud point of the blended middle distillate product.

Example 5

Ideal Hydrocracker Paraffin Compositions

Figure 4:
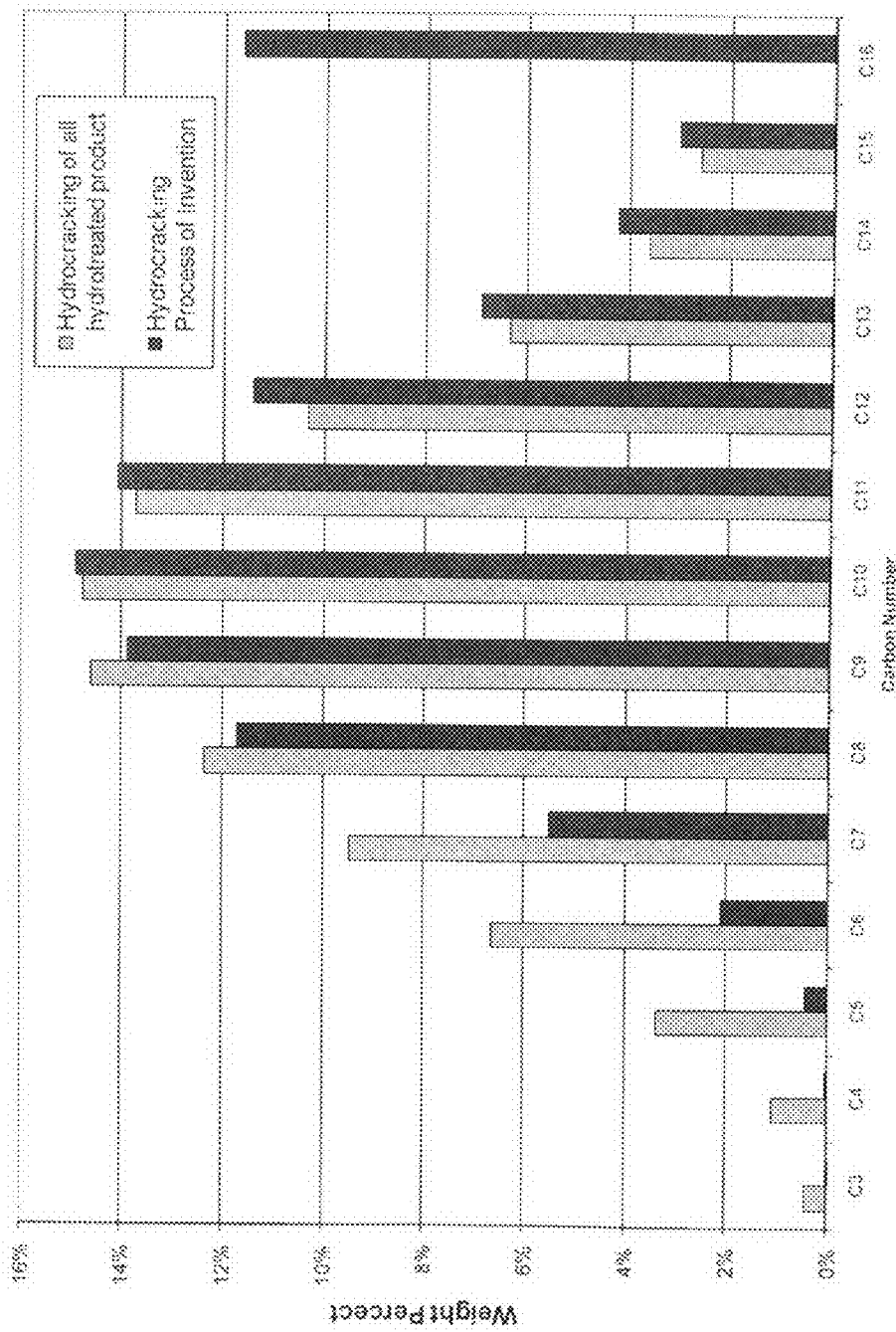
FIG. 4 is a bar graph showing carbon number distribution of middle distillate fuel produced by present invention.

Hydrocracked paraffin composition distributions predicted by a hydrocracking model are presented in FIG. 4. Two compositions are shown: (1) hydrocracker product from hydrocracking of a typical $C_{16}$-$C_{18}$ n-paraffin composition derived from hydrotreating of a typical animal-derived fat, and (2) hydrocracker product from same feedstock wherein only $C_{17}$ plus components were cracked according to inventive process of this invention. The lower concentration of $C_8$ minus components in the hydrocracker product indicates the increase in middle distillate yield for the process.

What is claimed is:

1. A process for producing hydrocarbons from biomass, comprising the steps of:
   (a) providing a renewable biological feedstock stream containing free fatty acids, fatty acid esters, or combinations thereof;
   (b) subjecting the feed stream to heat in the presence of hydrogen and a first catalyst to produce hydrocarbons which are predominantly n-paraffins;
   (c) separating the hydrocarbons into a lighter fraction and a heavier fraction;
   (d) hydrocracking the heavier fraction by subjecting the heavier fraction to heat in the presence of a second catalyst to produce lighter paraffins and a middle distillate fraction; and
   (e) combining the middle distillate fraction of the hydrocracked products with the lighter n-paraffin fraction to yield a middle distillate fuel.

2. The process of claim 1 wherein the first catalyst is a supported NiMo, NiW, or CoMo catalyst, the support being alumina, or alumina with phosphorous or silicon oxides.

3. The process of claim 1 wherein the first catalyst is utilized in such a way that the biofeed conversion catalyst formulations at the inlet to the first catalyst zone are less active than the biofeed conversion catalyst formulations at the outlet of the first catalyst zone.

4. The process of claim 1 wherein the separated hydrocarbon light fraction comprises predominately n-hexadecane ($C_{16}$) and lighter hydrocarbons.

5. The process of claim 1 wherein the separated hydrocarbon heavy fraction comprises n-heptadecane ($C_{17}$) and heavier.

6. The process of claim 1 wherein the n-paraffins are separated by use of a distillation column.

7. The process of claim 1 wherein the n-paraffins are separated by counter-contacting with water vapor, hydrogen, or nitrogen.

8. The process of claim 1 wherein the second catalyst contains one or more of Pt, Pd, Ni, on amorphous or crystalline supports containing one or more of alumina, fluorided alumina, silica, ferrierite, ZSM-12, ZSM-21, ZSM-22, ZSM-23, SAPO-11, SAPO-31, and SAPO-41.

* * * * *